US011431730B2

(12) United States Patent
Keisam et al.

(10) Patent No.: US 11,431,730 B2
(45) Date of Patent: Aug. 30, 2022

(54) SYSTEMS AND METHODS FOR EXTENDING AUTHENTICATION IN IP PACKETS

(71) Applicant: Cisco Technology, Inc., San Jose, CA (US)

(72) Inventors: Suresh Singh Keisam, San Jose, CA (US); Prabahar Radhakrishnan, Dublin, CA (US); David Mark Carrel, Tiburon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 137 days.

(21) Appl. No.: 16/694,809

(22) Filed: Nov. 25, 2019

(65) Prior Publication Data

US 2021/0160251 A1 May 27, 2021

(51) Int. Cl.
*H04L 29/06* (2006.01)
*H04L 9/40* (2022.01)

(52) U.S. Cl.
CPC .......... *H04L 63/126* (2013.01); *H04L 63/061* (2013.01); *H04L 63/14* (2013.01); *H04L 63/205* (2013.01)

(58) Field of Classification Search
CPC ..... H04L 63/126; H04L 63/14; H04L 63/061; H04L 63/205; H04L 63/12; H04L 63/1433; H04L 63/06; H04L 63/20; H04L 63/0485; H04L 29/06
See application file for complete search history.

(56) References Cited

U.S. PATENT DOCUMENTS

| 7,003,118 | B1* | 2/2006 | Yang | H04L 63/0485 |
| | | | | 709/224 |
| 9,894,044 | B2* | 2/2018 | Robba | H04W 12/03 |
| 2007/0110054 | A1* | 5/2007 | Kozakai | H04L 29/125 |
| | | | | 370/389 |
| 2008/0013546 | A1* | 1/2008 | Bhatt | H04L 67/142 |
| | | | | 379/114.03 |
| 2018/0191493 | A1* | 7/2018 | Huang | H04L 63/061 |
| 2020/0195431 | A1* | 6/2020 | Athmalingam | H04L 63/061 |

OTHER PUBLICATIONS

Wouters, P. et al., "Cryptographic Algorithm Implementation Requirements and Usage Guidence," Internet Engineering Task Force (IETF), https://tools.ietf.org/html/rfc8221, Oct. 2017, 15 pages.

* cited by examiner

*Primary Examiner* — Quazi Farooqui
(74) *Attorney, Agent, or Firm* — Baker Botts, LLP

(57) ABSTRACT

In one embodiment, a method includes negotiating, by a networking device, a security association with a peer and receiving, by the networking device, an Internet Protocol (IP) packet from the peer. The IP packet includes an outer IP header, an ESP header, a protocol header, data, an ESP trailer, and ESP authentication data. The method further includes performing, using an IP Security (IPSec) authentication algorithm, authentication checks for the outer IP header, the ESP header, the protocol header, the data, the ESP trailer, and the ESP authentication data of the IP packet.

18 Claims, 5 Drawing Sheets

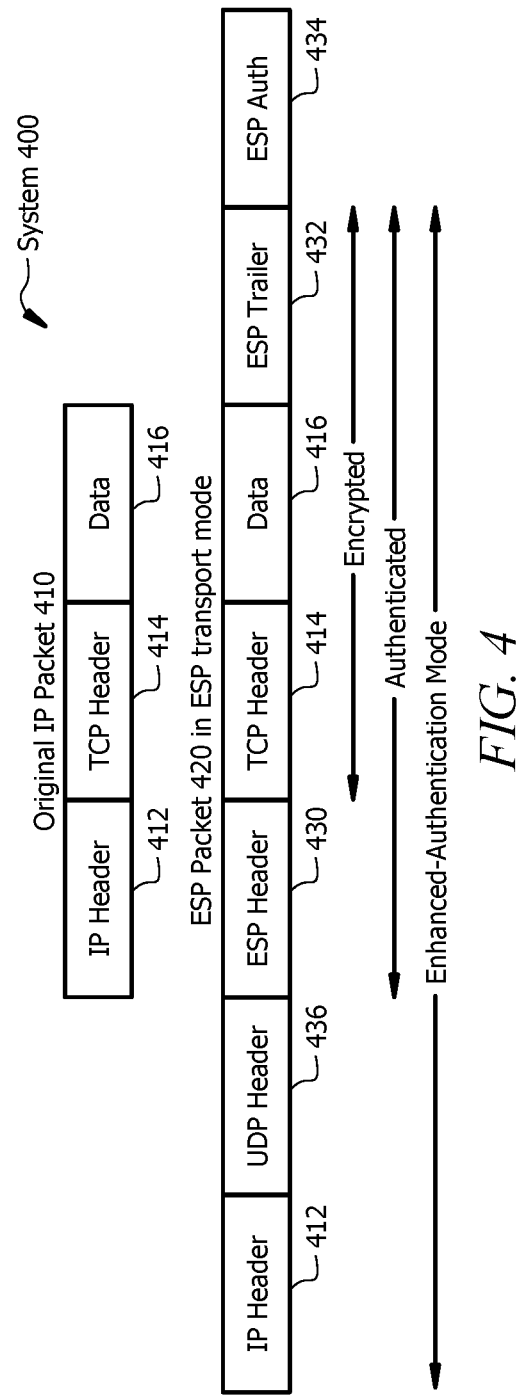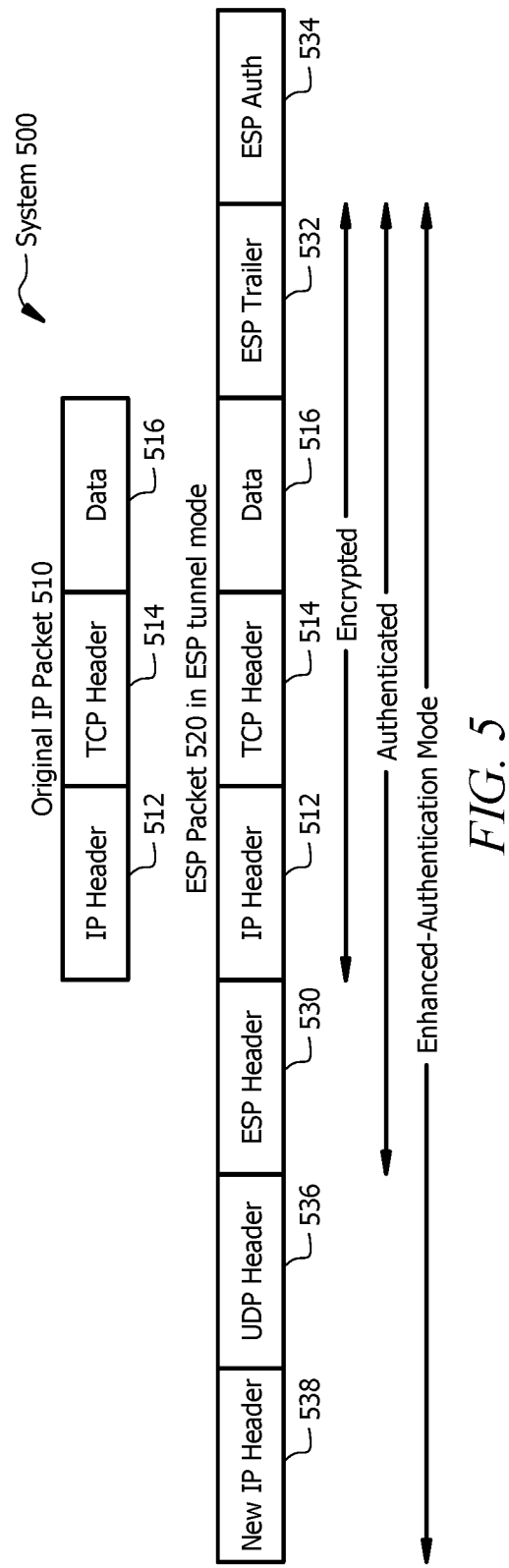

SYSTEMS AND METHODS FOR EXTENDING AUTHENTICATION IN IP PACKETS

TECHNICAL FIELD

This disclosure generally relates to performing authentication checks for Internet Protocol (IP) packets, and more specifically to systems and methods for extending authentication in IP packets.

BACKGROUND

Sensitive information may be transmitted through one or more nodes within a network. Certain nodes within the network may become compromised. For example, an attacker may gain access to one or more of the network nodes. If a network node is compromised, traditional protections such as link encryption may prove ineffectual in protecting the sensitive information traversing the compromised node.

BRIEF DESCRIPTION OF THE DRAWINGS

FIG. 4 illustrates an example system for extending authentication of IP packets with NAT traversal in ESP transport mode;

FIG. 5 illustrates an example system for extending authentication of IP packets with NAT traversal in ESP tunnel mode;

DESCRIPTION OF EXAMPLE EMBODIMENTS

Overview

Figure 1:
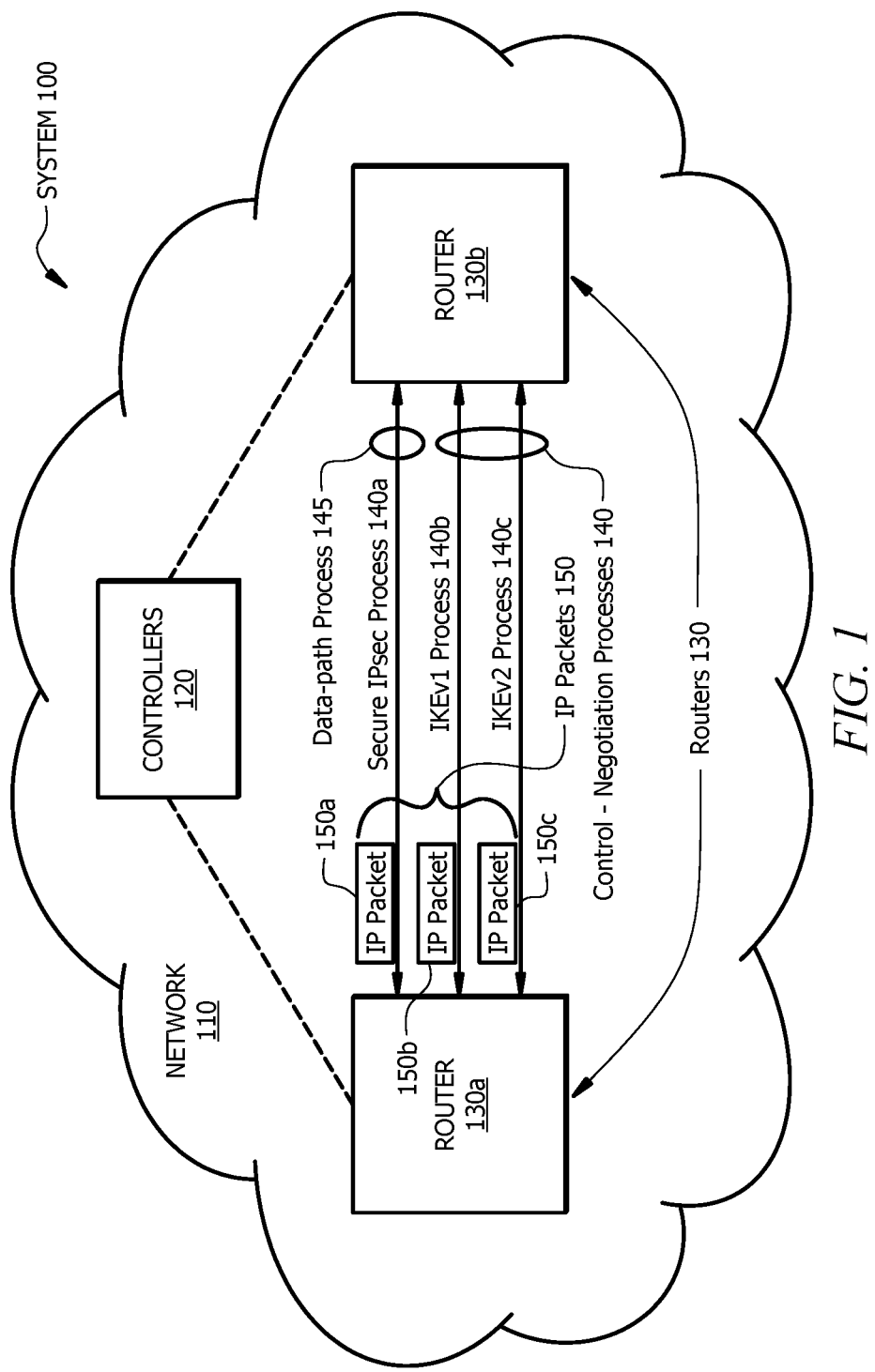
FIG. 1 illustrates an example system for extending authentication of IP packets.

According to an embodiment, a networking device includes one or more processors and one or more computer-readable non-transitory storage media coupled to the one or more processors. The one or more computer-readable non-transitory storage media include instructions that, when executed by the one or more processors, cause the networking device to perform operations including negotiating a security association with a peer and receiving an IP packet from the peer. The IP packet includes an outer IP header, an ESP header, a protocol header, data, an ESP trailer, and ESP authentication data. The operations further include performing, using an IP Security (IPSec) authentication algorithm, authentication checks for the outer IP header, the ESP header, the protocol header, the data, the ESP trailer, and the ESP authentication data of the IP packet.

An Internet Key Exchange (IKE) protocol may be used by the networking device to negotiate the security association with the peer. In certain embodiments, the IKE protocol is an IKE version 1 (IKEv1) protocol, IP address information is included in a NAT-Original Address (NAT-OA) payload received by the networking device from the peer, and the IP address information includes original source and destination IP addresses. In certain embodiments, the IKE protocol is an IKE version 2 (IKEv2) protocol, IP address information is included in a traffic selector payload received by the networking device from the peer, and the IP address information includes original source and destination IP addresses.

The IP packet may include a User Datagram Protocol (UDP) encapsulation header. The operations may include performing authentication checks for the UDP encapsulation header of the IP packet. Negotiating the security association with the peer may include determining that the peer supports performing authentication checks for the outer IP header of the IP packet without using an IPsec Authentication Header (AH) protocol. The networking device may receive IP address information from the peer prior to receiving the IP packet from the peer.

According to another embodiment, a method includes negotiating, by a networking device, a security association with a peer and receiving, by the networking device, an IP packet from the peer. The IP packet includes an outer IP header, an ESP header, a protocol header, data, an ESP trailer, and ESP authentication data. The method further includes performing, using an IPSec authentication algorithm, authentication checks for the outer IP header, the ESP header, the protocol header, the data, the ESP trailer, and the ESP authentication data of the IP packet.

According to yet another embodiment, one or more computer-readable non-transitory storage media embody instructions that, when executed by a processor, cause the processor to perform operations including negotiating a security association with a peer and receiving an IP packet from the peer. The IP packet includes an outer IP header, an ESP header, a protocol header, data, an ESP trailer, and ESP authentication data. The operations further include performing, using an (IPSec authentication algorithm, authentication checks for the outer IP header, the ESP header, the protocol header, the data, the ESP trailer, and the ESP authentication data of the IP packet.

Technical advantages of certain embodiments of this disclosure may include one or more of the following. Certain systems and methods described herein extend ESP authentication in IP packets by using information obtained during a negotiation process between IPsec peers, which eliminates the need to use an IPsec AH protocol. Eliminating the use of the IPsec AH protocol reduces AH header overhead (e.g., 12 bytes or 16 bytes if Extended Sequence Number is used) and increases performance of IPsec. Certain embodiments of this disclosure may reduce software-defined networking in a wide area network (SD-WAN) cost for consumers with minimum changes to code and deployment.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes an enhanced authentication mode for performing authentication checks for an entire IP packet without using AH IPsec protocol. The enhanced authentication mode uses information (e.g., original source and destination IP address information) shared during a negotiation process between two peers to authenticate the outer IP header. As such, an AH header is not required for authentication of the entire packet, which reduces overhead and increases the performance of IPsec.

Figure 2:
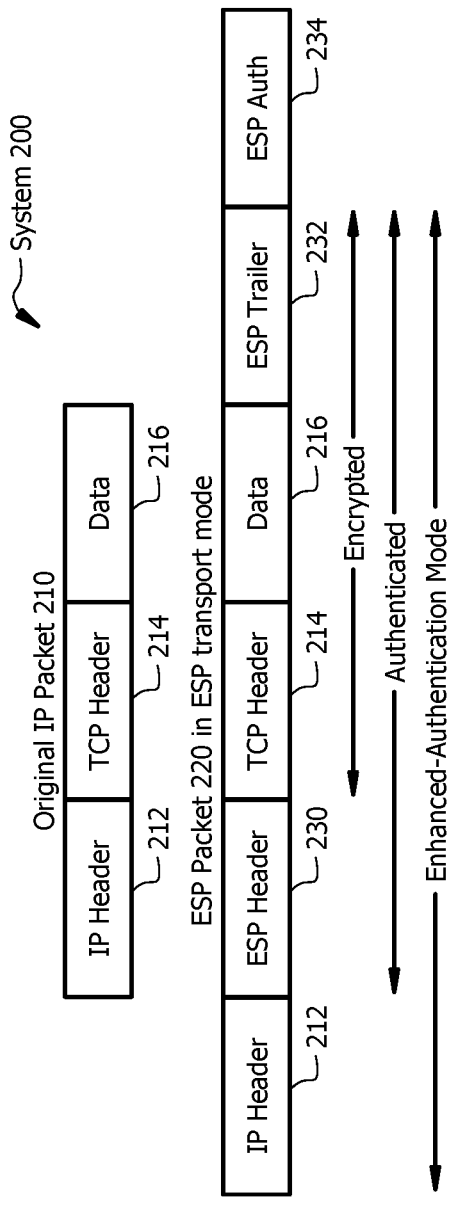
FIG. 2 illustrates an example system for extending authentication of IP packets without Network Address Translation (NAT) traversal in Encapsulating Security Payload (ESP) transport mode.
Figure 3:
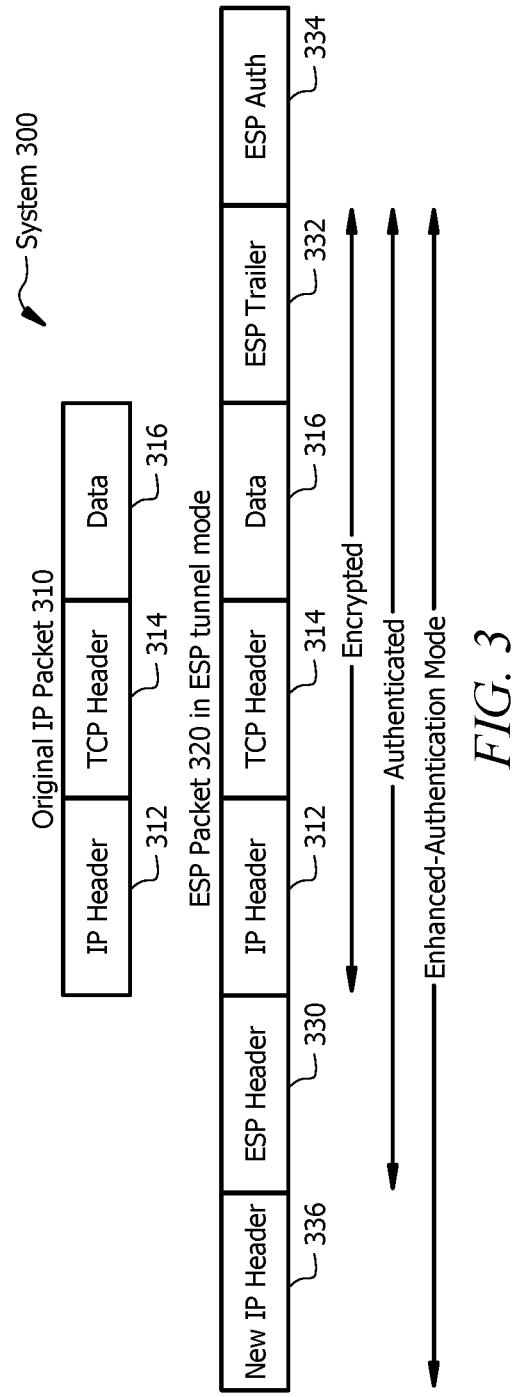
FIG. 3 illustrates an example system for extending authentication of IP packets without NAT traversal in ESP tunnel mode.
Figure 6:
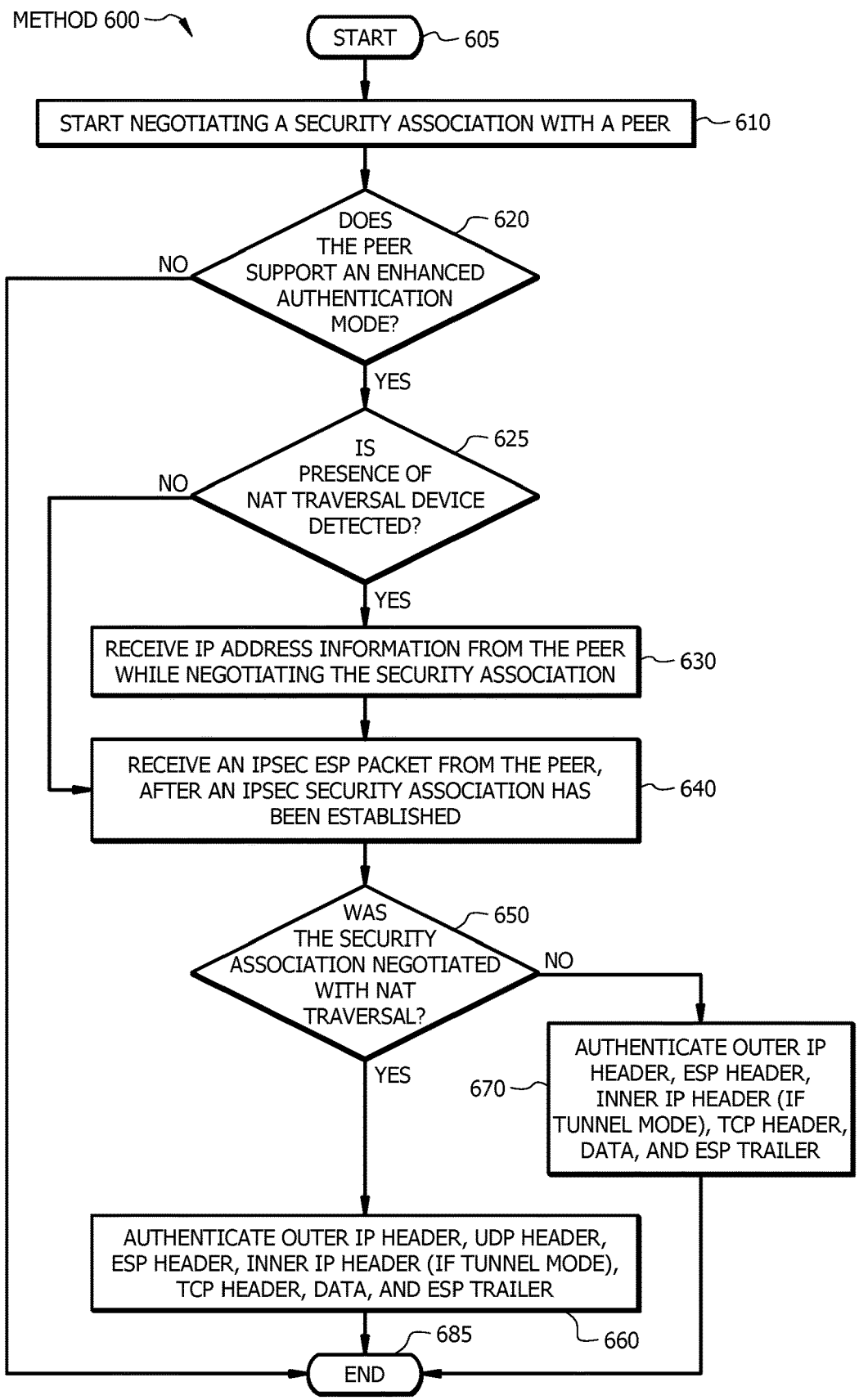
FIG. 6 illustrates an example method for extending authentication of IP packets.
Figure 7:
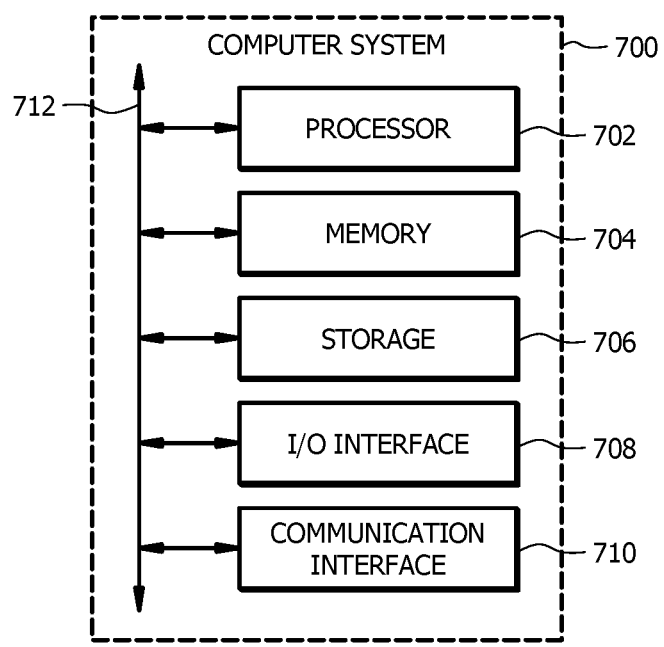
FIG. 7 illustrates an example computer system that may be used by the systems and methods described herein.

FIG. 1 shows an example system for extending authentication of IP packets. FIG. 2 shows an example system for extending authentication of IP packets without NAT traversal in ESP transport mode, and FIG. 3 shows an example system for extending authentication of IP packets without NAT traversal in ESP tunnel mode. FIG. 4 shows an example system for extending authentication of IP packets with NAT traversal in ESP transport mode, and FIG. 5 shows an example system for extending authentication of IP packets with NAT traversal in ESP tunnel mode. FIG. 6 shows an example method for extending authentication of IP packets. FIG. 7 shows an example computer system that may be used by the systems and methods described herein.

FIG. 1 illustrates an example system 100 for extending authentication of IP packets. System 100 or portions thereof may be associated with an entity, which may include any entity, such as a business or company (e.g., a service provider) that extends authentication of IP packets. The components of system 100 may include any suitable combination of hardware, firmware, and software. For example, the components of system 100 may use one or more elements of the computer system of FIG. 7.

System 100 includes a network 110, controllers 120, routers 130, control-control-negotiation processes 140, data-path processes 145, and IP packets 150. Network 110 of system 100 is any type of network that facilitates communication between components of system 100. Network 110 may connect one or more components of system 100. This disclosure contemplates any suitable network. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like. Network 110 may implement SD-WAN technology. SD-WAN is a specific application of software defined networking technology applied to WAN connections (e.g., broadband Internet, 4G, 5G, LTE, Multiprotocol Label Switching (MPLS), etc.). SD-WAN connects enterprise networks (e.g., branch offices and data centers) over large geographic distances.

Controllers 120 of system 100 represent any suitable computing components that may be used to process information for system 100. Controllers 120 may coordinate one or more components of system 100 and/or facilitate communication between one or more components of system 100. Controllers 120 may receive data from and/or transmit data to one or more components of system 100. Controllers 120 may be located in any suitable location to process information for system 100. For example, controllers 120 may be located at a data center, within a cloud computing environment, and the like. Controllers 120 may include one or more SD-WAN controllers. SD-WAN controllers manage and distribute information (e.g., SD-WAN policies) within network 110. Controllers 120 may include one or more management controllers, one or more smart controllers, one or more orchestrator controllers, and the like.

Routers 130 (e.g., router 130a and router 130b) of system 100 are connection points that can receive, create, store, and/or send data. Routers 130 may be managed by an administrator (e.g., a service provider) of network 110. Routers 130 may include one or more endpoints and/or one or more redistribution points that recognize, process, and forward data to other routers 130. Routers 130 may include host computers, personal computers, smartphones, Internet of Things (IOT) devices, edge routers, gateways, and the like. In certain embodiments, routers 130 include data communications equipment such as switches, bridges, modems, hubs, and the like. In some embodiments, routers 130 may include data terminal equipment such as routers, servers, printers, workstations, and the like.

Routers 130 may act as an interface for communication with routers 130 of a different domain. For example, router 130a may be an edge router of a remote site (e.g., a first branch office) and router 130b may be an edge router of a different remote site (e.g., a second branch office.) The remote sites may be associated with a data center. Routers 130 may communicate with the data center via network 110. For example, routers 130 may communicate with the data center through an Internet connection, an MPLS connection, and the like.

Control-negotiation processes 140 of system 100 are processes used to establish IPsec security associations between routers 130 of system 100. Data-path process 145 of system 100 are actual IPSec protected tunnels which are created only after control-negotiation processes 140 are successful. IPsec is a framework of open standards for ensuring secure private communications over the Internet. IPsec provides secure tunnels between two routers 130. An administrator of system 100 may define which IP packets 150a are considered sensitive and should be sent through these secure IP Sec tunnels. The administrator may specify characteristics of these tunnels that define the parameters used to protect these sensitive packets. If, for example, router 130a receives sensitive IP packets 150a, router 130a establishes the appropriate secure tunnels to communicate IP packets 150a through the tunnels to router 130b. These tunnels are sets of security associations that are established between two IPsec peers (e.g., router 130a and router 130b). The security associations define which protocols and algorithms should be applied to sensitive IP packets 150a and specify the keying material to be used by the two IPsec peers. Security associations are unidirectional and are established per security protocol (e.g., ESP). Control-negotiation processes 140 include IKE version 1 (IKEv1) process 140b and IKE version 2 (IKEv2) process 140c. IP packets 150b are associated with IKEv1 process 140b and IP packets 150c are associated with IKEv2 process 140c. Data-path process 145 includes secure IPSec process 140a. IP packets 150a are associated with data-path process 145.

IPsec process 140a is a data-path process where an administrator defines which traffic is to be protected between router 130a and router 130b. For example, the administrator may configure access lists that may be used to select network traffic. The traffic may be selected based on source and destination address. IKEv1 process 140b and IKEv2 process 140c each implement IKE. IKE is a key management protocol standard used in conjunction with the IPsec standard to authenticate IPsec peers (e.g., router 130a and router 130b), negotiate and distribute IPsec security keys, and/or to automatically establish IPsec security associations. IKE enhances IPsec by providing additional features, flexibility, and ease of configuration for the IPsec standard.

The IKE negotiation process for each of IKEv1 process and IKEv2 process 140c includes two phases. Phase 1 negotiates a security association between two IKE peers (e.g., router 130a and router 130b), which allows the peers to communicate securely in Phase 2. During Phase 2 negotiation, IKE establishes IPSec security associations used to protect data packets from various applications. Both phases use proposals when they negotiate a connection. An IKE proposal is a set of algorithms that two peers (e.g., router 130a and router 130b) use to secure the IKE negotiation between them. IKE negotiation begins by each peer agreeing on a common (shared) IKE policy. This policy states which security parameters will be used to protect subsequent IKE negotiations. For IKEv1 process 140b, IKE proposals contain a single set of algorithms and a modulus group. The administrator can create multiple, prioritized policies at each peer to ensure that at least one policy matches a remote peer's policy. For IKEv2 process 140c, IKE proposals allow the administrator to select multiple algorithms and modulus groups from which peers can choose during the Phase 1 negotiation. Several IKE proposals may be defined per VPN tunnel.

During each negotiation process 140, each peer (e.g., router 130a and 130b) determines whether the other peer supports an enhanced ESP authentication mode. The enhanced ESP authentication mode authenticates an outer IP header of an IP packet without using an IPsec AH protocol. This determination may be performed by sending a newly defined security association attribute type during the negotiation message exchange between the two peers. For IKEv1 process 140b, a newly defined security association attribute type may be sent during Phase 2. For IKEv2 process 140c, a newly defined security association attribute type may be sent during the third and fourth message of the IKE authentication exchange and during the first and second message of the child create security association exchange.

IP packets 150 of system 100 are formatted units of data carried by network 110. IP packets 150 include control information and payload data. Control information provides data for communicating the payload data within network 110. Control information may be included in headers and trailers. IP packets 150a may be encapsulated using ESP. ESP is a transport layer security protocol designed to function with Internet Protocol version 4 (IPv4) and/or Internet Protocol version 6 (IPv6). ESP uses an ESP header inserted into IP packet 150a after the outer IP header, before an upper layer protocol (e.g., Transmission Control Protocol (TCP), UDP, or Internet Control Message Protocol (ICMP)), and before any other IPsec headers that have already been inserted into IP packet 150a. ESP provides origin authenticity through source authentication, data integrity through hash functions, and/or confidentiality through encryption protection for IP packets 150a. IP packets 150a, which may include ESP packet 200 of FIG. 2, ESP packet 300 of FIG. 3, ESP packet 400 of FIG. 4, and ESP packet 500 of FIG. 5, are described in more detail in FIGS. 2 through 5 below.

IPsec supports two encryption modes: transport mode and tunnel mode. ESP in transport mode does not provide integrity and authentication for entire IP packet 150a. The IP header in ESP transport mode remains unprotected. In ESP tunnel mode, the entire original IP packet 150 is encapsulated and a new outer IP header is added to the beginning of the sequence. ESP tunnel mode provides integrity and authentication to inner IP packet 150 (including the inner IP header) while the new outer IP header remains unprotected. Thus, ESP in both transport mode and tunnel mode does not provide integrity and authentication for the outer IP header of IP packets 150.

Information obtained by routers 130 during control-negotiation processes 140 may be used to authenticate the outer IP header of IP packet 150, which eliminates the need to use an IPsec AH protocol. For secure IPsec process 140a without NAT traversal, the information required for the enhanced authentication mode may be obtained by exchanging original source and destination IP addresses during the negotiation message exchange between the two peers. For IKEv1 process 140b and/or IKEv2 process 140c with NAT traversal, the information exchanged to detect the presence of the NAT device may be used to obtain the information required for the enhanced authentication mode.

IKEv1 process 140b and/or IKEv2 process 140c may be used to detect the presence of a NAT device. IKEv1 process 140b uses a Vendor ID (VID) payload for discovery of NAT traversal support and NAT discovery (NAT-D) payload to detect the presence of NAT. IKEv2 process 140c uses VID-payload for discovery of NAT traversal support and a notification payload (e.g., NOTIFY-payload) to detect the presence of NAT. VID payload includes a hash of the vendor string. NAT-D payload includes a hash of address and port.

In certain embodiments, IKE peers (e.g., router 130a and router 130b) verify the received VID-payload hashes. The IKE peers use NAT-D payload (for IKEv1 process 140b) or the notification payload (for IKEv2 process 140c) to calculate the hashes. If the hashes match, each peer recognizes that a NAT device does not exist on the network path between them. If the hashes do not match (e.g., the address or port has been translated), then each peer performs NAT traversal to send IP packet 150 through network 110.

IKEv1 process 140b uses NAT-Original Address (NAT-OA) payload, which includes original source and destination IP addresses, to facilitate incremental TCP and UDP checksum verification in UDP encapsulated transport mode. For non-SD-WAN IKE/IPsec implementation, the NAT-OA payload information may be used to authenticate the outer IP header and/or the UDP encapsulation header. For SD-WAN IKEv1/IPsec implementation in UDP encapsulated tunnel mode, which does not use NAT-OA payload, both IKEv1 peers (e.g., router 130a and router 130b) exchange NAT-OA payloads (which include original source and destination IP addresses). Both IKEv1 peers (behind NAT) then use the received NAT-OA payload IP addresses as part of the input to perform authentication of the outer IP header and/or the UDP encapsulation header.

IKEv2 process 140c uses Traffic-Selector payload, which includes original source and destination IP addresses, to facilitate incremental TCP and UDP checksum verification in UDP encapsulated transport mode. For non-SD-WAN IKE/IPsec implementation, the Traffic-Selector payload information is used to authenticate the outer IP header and/or the UDP encapsulation header in UDP encapsulated transport mode. For SD-WAN IKEv2/IPsec implementation in UDP encapsulated tunnel mode, which does not use Traffic-Selector payload, both IKEv2 peers (e.g., router 130a and router 130b) exchange Traffic-Selector payloads (which include original source and destination IP addresses). Both IKEv2 peers (behind NAT) then use the received Traffic-Selector-payload IP addresses as part of the input to perform authentication of the outer IP header and/or the UDP encapsulation header.

In operation, router 130a negotiates a security association with router 130b using one or more control-negotiation processes 140 (e.g., IKEv1 process 140b, or IKEv2 process 140c.) While negotiating the security association with router 130b, router 130a receives information from router 130b. The information may include IP address information such as original source and destination IP addresses. Once the security association is established, router 130a receives IP packet 150a from router 130b. IP packet has been encapsulated using ESP and includes an outer IP header, an ESP header, a TCP header, payload data, an ESP trailer, and ESP authentication data. Router 130 authenticates the outer IP header, the ESP header, the TCP header, the payload data, and the ESP trailer of the IP packet using the ESP authentication. As such, router 130 authenticates entire IP packet 150a without using an AH header, which reduces overhead and increases the performance of IPsec.

Although FIG. 1 illustrates a particular arrangement of network 110, controllers 120, routers 130, control-negotiation processes 140, data-path processes 145, and IP packets 150, this disclosure contemplates any suitable arrangement of network 110, controllers 120, routers 130, control-negotiation processes 140, data-path processes 145, and IP packets 150. For example, router 130a may be a host computer and router 130b may be an edge device router. Although FIG. 1 illustrates a particular number of networks 110, controllers 120, routers 130, control-negotiation processes 140, data-path processes 145, and IP packets 150, this disclosure contemplates any suitable number of networks 110, controllers 120, routers 130, control-negotiation processes 140, data-path processes 145, and IP packets 150. For example, system 100 may include a third router 130c, a fourth router 130d, and the like.

FIG. 2 illustrates an example system 200 for extending authentication of IP packets without NAT traversal in ESP transport mode. System 200 includes original IP packet 210. Original IP packet 210 may include the following: an IP header 212, a TCP header 214, and payload data 216. IP header 212 is located at the beginning of original IP packet 210 and may include information such as IP version, source IP address, destination IP address, time-to-live, and the like. IP header 212 may be an IPv4 header or an IPv6 header. TCP header 214 is used by TCP to package message data for communication over a network (e.g., network 110 of FIG. 1.) TCP header 214 includes the following ten fields totaling 20 bytes: source port, destination port, sequence number, acknowledgement number, data offset, reserved, flags, window, checksum, urgent pointer, and options. Payload data 216 is the actual data in original IP packet 210 and does not include headers attached for transport or descriptive metadata.

System 200 includes ESP packet 220 in ESP transport mode. ESP packet 220 includes IP header 212, TCP header 214, and payload data 216 of original IP packet 210. ESP packet 220 has been encapsulated with an ESP header 230, an ESP trailer 232, and ESP authentication data 234. ESP header 230 is designed to provide security services and is placed after IP header 212 and before the next layer protocol header (e.g., TCP header 214) in transport mode. ESP header includes a Security Parameters Index (SPI) and a sequence number. ESP trailer 232 is designed to provide security services and is placed after payload data 216. ESP trailer 232 includes a padding field, a padding length field, and a next header field. ESP authentication data 234 includes an authentication data field, which includes an Integrity Check Value (ICV) for verifying the sender's identity and the message's integrity. The ICV is determined based on ESP header 230 (outer IP header 212 is included in enhanced-authentication mode), payload data 216, and ESP trailer 232. As such, the sequence of ESP packet 220 is IP header 212, ESP header 230, TCP header 214, payload data 216, ESP trailer 232, and ESP authentication data 234.

ESP transport mode encrypts TCP header 214, payload data 216, and ESP trailer 232. ESP transport mode authenticates ESP header 230, TCP header 214, payload data 216, and ESP trailer 232. However, ESP transport mode does not encrypt or authenticate IP header 212. System 200 provides an enhanced-authentication mode, which authenticates IP header 212 using information (e.g., original source and destination IP address information) received by the peer during a negotiation process (e.g., negotiation process 140 of FIG. 1) and prior to receiving ESP packet 220. As such, system 200 extends authentication in ESP transport mode without using an AH header, which reduces overhead and increases the performance of IPsec.

FIG. 3 illustrates an example system 300 for extending authentication of IP packets without NAT traversal in ESP tunnel mode. System 300 includes original IP packet 310. Original IP packet 310 may include the following: an IP header 312, a TCP header 314, and payload data 316. IP header 312 is located at the beginning of original IP packet 310 may include information such as IP version, source IP address, destination IP address, time-to-live, and the like. IP header 312 may be an IPv4 header or an IPv6 header. TCP header 314 is used by TCP to package message data for communication over a network (e.g., network 110 of FIG. 1.) TCP header 314 includes the following ten fields totaling 20 bytes: source port, destination port, sequence number, acknowledgement number, data offset, reserved, flags, window, checksum, urgent pointer, and options. Payload data 316 is the actual data in original IP packet 210 and does not include headers attached for transport or descriptive metadata.

System 300 includes ESP packet 320 in ESP tunnel mode. ESP packet 320 includes IP header 312 (inner IP header 312), TCP header 314, and payload data 316 of original IP packet 310. ESP packet 320 has been encapsulated with an ESP header 330, an ESP trailer 332, ESP authentication data 334, and a new outer IP header 336. ESP header 330 is designed to provide security services and is placed after new outer IP header 336 and before the next layer protocol header in transport mode (e.g., TCP header 314). ESP header includes an SPI and a sequence number. ESP trailer 332 designed to provide security services and is placed after payload data 316. ESP trailer 332 includes a padding field, a padding length field, and a next header field. ESP authentication data 334 includes an authentication data field, which includes an ICV for verifying the sender's identity and the message's integrity. The ICV is determined based on ESP header 330 (outer IP header 336 is included in enhanced-authentication mode), payload data 316, and ESP trailer 332. Outer IP header 336 is the outermost IP header of ESP packet 320. Outer IP header 336 determines the IPsec policy that protects the inner IP packet. As such, the sequence of ESP packet 320 is new outer IP header 336, ESP header 330, inner IP header 312, TCP header 314, payload data 316, ESP trailer 332, and ESP authentication data 334.

ESP tunnel mode encrypts inner IP header 312, TCP header 314, payload data 316, and ESP trailer 332. ESP tunnel mode authenticates ESP header 330, inner IP header 312, TCP header 314, payload data 316, and ESP trailer 332. However, ESP tunnel mode does not encrypt or authenticate outer IP header 336. System 300 provides an enhanced-authentication mode, which authenticates outer IP header 336 using information (e.g., original source and destination IP address information) received by the peer during a negotiation process (e.g., negotiation process 140) and prior to receiving ESP packet 320. As such, system 300 extends authentication in ESP tunnel mode without using an AH header, which reduces overhead and increases the performance of IPsec.

FIG. 4 illustrates an example system 400 for extending authentication of IP packets with NAT traversal in ESP transport mode. System 400 includes original IP packet 410. Original IP packet 410 may include the following: an IP header 412, a TCP header 414, and payload data 416. IP header 412 is located at the beginning of original IP packet 410 and may include information such as IP version, source IP address, destination IP address, time-to-live, and the like. IP header 412 may be an IPv4 header or an IPv6 header. TCP header 414 is used by TCP to package message data for communication over a network (e.g., network 110 of FIG. 1.) In the illustrated embodiment, TCP header 414 includes the following ten fields totaling 20 bytes: source port, destination port, sequence number, acknowledgement number, data offset, reserved, flags, window, checksum, urgent pointer, and options. Payload data 416 is the actual data in original IP packet 410 and does not include headers attached for transport or descriptive meta-data.

System 400 includes ESP packet 420 in ESP transport mode. ESP packet 420 includes outer IP header 412, UDP encapsulation header 436, ESP header 430, TCP header 414, payload data 416, an ESP trailer 432, and ESP authentication data 434. ESP header 430 is designed to provide security services and is placed after IP header 412 and before the next layer protocol header in transport mode (e.g., TCP header 414). ESP header 430 includes an SPI and a sequence number. ESP trailer 432 designed to provide security services and is placed after payload data 216. ESP trailer 432 includes a padding field, a padding length field, and a next header field.

ESP authentication data 434 of ESP packet 420 includes an authentication data field, which includes an ICV for verifying the sender's identity and the message's integrity. The ICV is determined based on ESP header 430 (outer IP header 412 and UDP encapsulation header 436 are included in enhanced-authentication mode), payload data 416, and ESP trailer 432. UDP encapsulation header 436 is used to allow ESP packet 420 to successfully traverse a NAT device. UDP encapsulation header 436 is placed in front of ESP header 430. UDP encapsulation header 436 includes the following fields: source port, destination port, length, and checksum. As such, the sequence of ESP packet 420 is IP header 412, UDP encapsulation header 436, ESP header 430, TCP header 414, payload data 416, ESP trailer 432, and ESP authentication data 434.

Normal ESP transport mode authenticates ESP header 430, TCP header 414, payload data 416, and ESP trailer 432. However, normal ESP transport mode does not encrypt or authenticate IP header 412 or UDP encapsulation header 436. System 400 provides an enhanced-authentication mode, which authenticates IP header 412 and UDP encapsulation header 436 using information (e.g., original source and destination IP address information) received by the peer during a negotiation process (e.g., negotiation process 140) and prior to receiving ESP packet 420. As such, system 400 extends authentication in ESP transport mode without using an AH header, which reduces overhead and increases the performance of IPsec.

FIG. 5 illustrates an example system 500 for extending authentication of IP packets with NAT traversal in ESP tunnel mode. System 500 includes original IP packet 510. Original IP packet 510 may include the following: an IP header 512, a TCP header 514, and payload data 516. IP header 512 is located at the beginning of original IP packet 510 and may include information such as IP version, source IP address, destination IP address, time-to-live, and the like. IP header may be an IPv4 header or an IPv6 header. TCP header 514 is used by TCP to package message data for communication over a network (e.g., network 110 of FIG. 1). TCP header 314 includes the following ten fields totaling 20 bytes: source port, destination port, sequence number, acknowledgement number, data offset, reserved, flags, window, checksum, urgent pointer, and options. Payload data 516 is the actual data in original IP packet 210 and does not include headers attached for transport or descriptive meta-data.

System 500 includes ESP packet 520 in ESP tunnel mode. ESP packet 520 includes IP header 512 (inner IP header 512), TCP header 514, and payload data 516 of original IP packet 510. ESP packet 520 includes new outer IP header 538, UDP encapsulation header 536, ESP header 530, original IP header 512, TCP header 514, payload data 516, an ESP trailer 532, and ESP authentication data 534. ESP header 530 is designed to provide security services and is placed after new outer IP header 538 and before the next layer protocol header in transport mode (e.g., TCP header 514). ESP header 530 includes an SPI and a sequence number. ESP trailer 532 designed to provide security services and is placed after payload data 216. ESP trailer 532 includes a padding field, a padding length field, and a next header field.

ESP authentication data 534 of ESP packet 520 includes an authentication data field, which includes an ICV for verifying the sender's identity and the message's integrity. The ICV is determined based on ESP header 530 (outer IP header 538 and UDP encapsulation header 536 are included in enhanced-authentication mode), payload data 516, and ESP trailer 532. UDP encapsulation header 536 is used to allow ESP packet 520 to successfully traverse a NAT device. UDP encapsulation header 536 is placed in front of ESP header 530. UDP encapsulation header 536 includes the following fields: source port, destination port, length, and checksum. Outer IP header 538 is the outermost IP header of ESP packet 520. Outer IP header 538 determines the IPsec policy that protects the inner IP packet. As such, the sequence of ESP packet 520 is new IP header 538, UDP encapsulation header 536, ESP header 530, inner IP header 512, TCP header 514, payload data 516, ESP trailer 532, and ESP authentication data 534.

ESP tunnel mode encrypts inner IP header 512, TCP header 514, and payload data 516. ESP tunnel mode authenticates ESP header 530, inner IP header 512, TCP header 514, payload data 516, and ESP trailer 532. However, ESP tunnel mode does not encrypt or authenticate outer IP header 538. System 500 provides an enhanced-authentication mode, which authenticates outer IP header 538 using information (e.g., original source and destination IP address information) received by the peer during a negotiation process (e.g., negotiation process 140) and prior to receiving ESP packet 520. As such, system 500 extends authentication in ESP tunnel mode without using an AH header, which reduces overhead and increases the performance of IPsec.

Although FIGS. 2 through 5 illustrate a particular arrangement of the elements of systems 200, 300, 400, and 500, this disclosure contemplates any suitable arrangement of the elements of systems 200, 300, 400, and 500. For example, system 200 may include an additional header field after ESP header 230. Although FIGS. 2 through 5 illustrate a particular number of elements within systems 200, 300, 400, and 500, this disclosure contemplates any suitable number of particular number of elements within systems 200, 300, 400, and 500. For example, system 200 may include more than one original IP packet 210 and/or more than one ESP packet 220.

FIG. 6 illustrates an example method 600 for extending authentication of IP packets. Method 600 begins at step 605. At step 610, a router starts negotiating a security association with a peer. For example, router 130a of FIG. 1 may negotiate a security association with router 130b of FIG. 1 using secure IKEv2 process 140c. As another example, router 130a of FIG. 1 may negotiate a security association with router 130b of FIG. 1 using secure IKEv1 process 140b. Method 600 then moves from step 610 to step 620.

At step 620 of method 600, the router determines whether the peer supports an enhanced authentication mode. The enhanced authentication mode includes authenticating an outer IP header of an IP packet (e.g., IP packet 150a of FIG. 1) without using an IPsec AH protocol. The router may determine whether the peer supports the enhanced authentication mode by sending a newly defined security association attribute during the negotiation. If the router determines that the peer does not support the enhanced authentication mode, method 600 advances from step 620 to step 685, where method 600 ends. If the router determines that the peer supports the enhanced authentication mode, method 600 moves from step 620 to step 625. At step 625 of method 600, the router checks if the presence of a NAT device is detected. If the presence of a NAT device is not detected, method 600 moves from step 625 to step 640. If the presence of a NAT device is detected, method 600 moves from step 625 to step 630.

At step 630 of method 600, the router receives IP address information from the peer while negotiating the security session. For example, if router 130a of FIG. 1 negotiates the security association with router 130b of FIG. 1 using secure IKEv1 process 140b, the router may receive NAT-OA payload information, which includes the original source and destination IP addresses. As another example, if router 130a of FIG. 1 negotiates the security association with router 130b of FIG. 1 using secure IKEv2 process 140c, the router may receive Traffic-Selector payload information, which includes the original source and destination IP addresses. Method 600 then moves from step 630 to step 640.

At step 640 of method 600, the negotiation process between the router and the peer is complete, and the router receives an IPSec ESP packet from the peer after an IPSec security association has been established. The IP packet, which has been encapsulated using ESP, includes an outer IP header, an ESP header, a TCP header, payload data, an ESP trailer, and ESP authentication data in that sequence. If the IP packet has been encapsulated in ESP tunnel mode, the IP packet further includes a new outer IP header at the beginning of the sequence. If the IP packet supports NAT traversal, the IP packet further includes a UDP encapsulation header inserted between the IP header (or for ESP tunnel mode, the new outer IP header) and the ESP header. Method 600 then moves from step 640 to step 650.

At step 650, the router determines whether the security association was negotiated with NAT traversal. If the security association was negotiated with NAT traversal, method 600 moves from step 650 to step 660, where the router performs, using an authentication algorithm (e.g., an IP Sec authentication algorithm), authentication checks and/or integrity checks for the outer IP header, the ESP header, one or more protocol headers (e.g. a Layer-2, Layer-3, Layer 4, Ethernet, IP, MPLS, Virtual Extensible LAN (VXLAN), TCP, or UDP protocol header), the data, the ESP trailer, and the ESP authentication data of the IP packet. For example, the router may authenticate the outer IP header, the UDP encapsulation header, the ESP header, the inner IP header (if tunnel mode), the TCP header, the payload data, and the ESP trailer. The router may use the immutable IP header fields from the received IP packet as one of the inputs to the authentication algorithm on ingress use the immutable outer IP header fields of the outgoing IP packet as one of the inputs to the authentication algorithm on egress. The router may use the IP address information received during the negotiation process for to perform the authentication and/or integrity checks. Method 600 then moves from step 660 to step 685, where method 600 ends.

If the security association was not negotiated with NAT traversal, method 600 moves from step 650 to step 670, where the router performs, using an authentication algorithm (e.g., an IPSec authentication algorithm), authentication checks and/or integrity checks for the outer IP header, the ESP header, one or more protocol headers, the data, the ESP trailer, and the ESP authentication data of the IP packet. For example, the router may authenticate the outer IP header, the ESP header, the inner IP header (if tunnel mode), the TCP header, the payload data, and the ESP trailer. The router may use the immutable IP header fields from the received IP packet as one of the inputs to the authentication algorithm on ingress use the immutable outer IP header fields of the outgoing IP packet as one of the inputs to the authentication algorithm on egress. The router may use the IP address information received during the negotiation process for to perform the authentication and/or integrity checks. Method 600 then moves from step 670 to step 685, where method 600 ends. This enhanced authentication mode of authenticating the outer IP header of an IP packet without using an IPsec AH protocol negates the need to include an AH header within the IP packet, which reduces overhead and increases the performance of IPsec.

Although this disclosure describes and illustrates an example method 600 for extending authentication of IP packets including the particular steps of the method of FIG. 6, this disclosure contemplates any suitable method 600 for extending authentication of IP packets, including any suitable steps, which may include all, some, or none of the steps of the method of FIG. 6, where appropriate. For example, if the router determines in step 620 that the peer does not support the enhanced authentication mode, rather than ending the method, the router may determine to use the IPsec AH protocol in combination with ESP to authenticate the entire IP packet. As another example, method 600 may include an additional step directed to the router encrypting the TCP header, the payload data, and the ESP trailer of the IP packet.

Although this disclosure describes and illustrates particular steps of method 600 of FIG. 6 as occurring in a particular order, this disclosure contemplates any suitable steps of method 600 of FIG. 6 occurring in any suitable order. Although this disclosure describes and illustrates particular components, devices, or systems carrying out particular steps of method 600 of FIG. 6, this disclosure contemplates any suitable combination of any suitable components, devices, or systems carrying out any suitable steps of method 600 of FIG. 6. For example, a controller (e.g., controller 120 of FIG. 1), a personal computer, a switch, a smartphone, an IOT device, or a server may perform one or more of the steps of method 600.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them.

Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A networking device, comprising:
one or more processors; and
one or more computer-readable non-transitory storage media coupled to the one or more processors and comprising instructions that, when executed by the one or more processors, cause the networking device to perform operations comprising:
negotiating a security association with a peer;
receiving IP address information from the peer;
receiving an Internet Protocol (IP) packet from the peer, the IP packet comprising an outer IP header, an Encapsulating Security Payload (ESP) header, a protocol header, data, an ESP trailer, and ESP authentication data; and
performing, using an IP Security (IPSec) authentication algorithm and the IP address information, authentication checks for the outer IP header, the ESP header, the protocol header, the data, the ESP trailer, and the ESP authentication data of the IP packet without using an IPsec Authentication Header (AH) protocol.

2. The networking device of claim 1, wherein an Internet Key Exchange (IKE) protocol is used to negotiate the security association with the peer.

3. The networking device of claim 2, wherein:
the IKE protocol is the IKE version 1 (IKEv1) protocol;
the IP address information is included in a Network Address Translation-Original Address (NAT-OA) payload received by the networking device from the peer; and
the IP address information comprises original source and destination IP addresses.

4. The networking device of claim 2, wherein:
the IKE protocol is the IKE version 2 (IKEv2) protocol;
the IP address information is included in a traffic selector payload received by the networking device from the peer; and
the IP address information comprises original source and destination IP addresses.

5. The networking device of claim 1, wherein:
the IP packet further comprises a User Datagram Protocol (UDP) encapsulation header; and
the operations further comprise performing, using the IPSec authentication algorithm, an authentication check for the UDP encapsulation header of the IP packet.

6. The networking device of claim 1, wherein negotiating the security association with the peer comprises determining that the peer supports performing authentication checks for the outer IP header of the IP packet without using the IPsec AH protocol.

7. A method, comprising:
negotiating, by a networking device, a security association with a peer;
receiving, by the networking device, IP address information from the peer;
receiving, by the networking device, an Internet Protocol (IP) packet from the peer, the IP packet comprising an outer IP header, an Encapsulating Security Payload (ESP) header, a protocol header, data, an ESP trailer, and ESP authentication data; and
performing, using an IP Security (IPSec) authentication algorithm and the IP address information, authentication checks for the outer IP header, the ESP header, the protocol header, the data, the ESP trailer, and the ESP authentication data of the IP packet without using an IPsec Authentication Header (AH) protocol.

8. The method of claim 7, wherein an Internet Key Exchange (IKE) protocol is used to negotiate the security association with the peer.

9. The method of claim 8, wherein:
the IKE protocol is the IKE version 1 (IKEv1) protocol;
the IP address information is included in a Network Address Translation-Original Address (NAT-OA) payload received by the networking device from the peer; and
the IP address information comprises original source and destination IP addresses.

10. The method of claim 8, wherein:
the IKE protocol is the IKE version 2 (IKEv2) protocol;
the IP address information is included in a traffic selector payload received by the networking device from the peer; and
the IP address information comprises original source and destination IP addresses.

11. The method of claim 7, wherein:
the IP packet further comprises a User Datagram Protocol (UDP) encapsulation header; and
the method further comprises performing, using the IPSec authentication algorithm, an authentication check for the UDP encapsulation header of the IP packet.

12. The method of claim 7, wherein negotiating the security association with the peer comprises determining that the peer supports performing authentication checks for the outer IP header of the IP packet without using the IPsec AH protocol.

13. One or more computer-readable non-transitory storage media embodying instructions that, when executed by a processor, cause the processor to perform operations comprising:
negotiating a security association with a peer;
receiving, by the networking device, IP address information from the peer;
receiving, by a networking device, an Internet Protocol (IP) packet from the peer, the IP packet comprising an outer IP header, an Encapsulating Security Payload (ESP) header, a protocol header, data, an ESP trailer, and ESP authentication data; and performing, using an IP Security (IPSec) authentication algorithm and the IP address information, authentication checks for the outer IP header, the ESP header, the protocol header, the data, the ESP trailer, and the ESP authentication data of the IP packet without using an IPsec Authentication Header (AH) protocol.

14. The one or more computer-readable non-transitory storage media of claim 13, wherein an Internet Key Exchange (IKE) protocol is used to negotiate the security association with the peer.

15. The one or more computer-readable non-transitory storage media of claim 14, wherein:
the IKE protocol is the IKE version 1 (IKEv1) protocol;
the IP address information is included in a Network Address Translation-Original Address (NAT-OA) payload received by the networking device from the peer; and
the IP address information comprises original source and destination IP addresses.

16. The one or more computer-readable non-transitory storage media of claim 14, wherein:
the IKE protocol is the IKE version 2 (IKEv2) protocol;
the IP address information is included in a traffic selector payload received by the networking device from the peer; and
the IP address information comprises original source and destination IP addresses.

17. The one or more computer-readable non-transitory storage media of claim 13, wherein:
the IP packet further comprises a User Datagram Protocol (UDP) encapsulation header; and
the operations further comprise performing, using the IPSec authentication algorithm, an authentication check for the UDP encapsulation header of the IP packet.

18. The one or more computer-readable non-transitory storage media of claim 13, wherein negotiating the security association with the peer comprises determining that the peer supports performing authentication checks for the outer IP header of the IP packet without using the IPsec AH protocol.

* * * * *